United States Patent [19]

Hoeink et al.

[11] 4,170,348

[45] Oct. 9, 1979

[54] TRANSPORT DEVICE FOR READING OF IDENTIFICATION CARDS

[75] Inventors: Helmut Höeink, Borchen; Waldemar Jaëger, Elsen; Peter Scholich, Sande; Rolf Roeschlein, Paderborn; Helmut Podtschaske, Sande, all of Fed. Rep. of Germany

[73] Assignee: Nixdorf Computer AG, Fed. Rep. of Germany

[21] Appl. No.: 785,017

[22] Filed: Apr. 6, 1977

[30] Foreign Application Priority Data

Apr. 27, 1976 [DE] Fed. Rep. of Germany ....... 2618439

[51] Int. Cl.$^2$ .............................................. B65H 9/00
[52] U.S. Cl. .................................... 271/240; 235/475; 271/271; 271/274; 271/275
[58] Field of Search ............... 271/250, 248, 243, 275, 271/277, 271, DIG. 9, 3, 8 R, 274, 273, 240; 235/61.11 R, 475; 226/187

[56] References Cited

U.S. PATENT DOCUMENTS

| | | | |
|---|---|---|---|
| 2,955,822 | 10/1960 | Wicklund | 271/243 |
| 3,358,555 | 12/1967 | Call | 271/274 X |
| 3,389,905 | 6/1968 | Boggs | 271/240 |
| 3,703,626 | 11/1972 | Shanrock | 235/61.11 R |
| 3,705,396 | 12/1972 | Nagaki et al. | 235/485 X |
| 3,787,661 | 1/1974 | Moorman et al. | 271/8 X |
| 3,898,432 | 8/1975 | Agnew et al. | 235/61.11 D |
| 4,035,614 | 7/1977 | Frattarola et al. | 235/61.11 R X |

Primary Examiner—Bruce H. Stoner, Jr.
Attorney, Agent, or Firm—Gifford, Chandler, Van Ophem, Sheridan & Sprinkle

[57] ABSTRACT

A device for the reading of identification cards and the like including a feed slot which directs the longitudinal edges of the card into spaced guide grooves which serve to straighten and properly align the card and into a conveyor which carries the card past a reading or checking device.

23 Claims, 4 Drawing Figures

TRANSPORT DEVICE FOR READING OF IDENTIFICATION CARDS

BACKGROUND OF THE INVENTION

I. Field of the Invention

The present invention relates to a transport device for the reading of identification cards such as I.D. cards, credit cards and the like (hereinafter referred to as ID cards) through linear movement of the cards, introduced through a feeding slot, by means of a conveyor belt which carries them past the reading device.

II. Description of the Prior Art

Transportation devices of this kind are used, for example, in automatic vending machines or ID card checking devices or in self-serve equipment. With their aid, ID cards which carry visible or invisible information symbols, can be carried past reading devices in order to determine whether the card carrier is entitled to perform certain actions and/or the amount up to which his credit is good. The interpretation device works, depending on the type of ID card information, according to the electro-magnetic, electrostatic or optical principle. When ID cards are transported past the device, they must have a precisely prescribed orientation in order to avoid faulty interpretation. Within this context it is also necessary that the card be kept a uniform distance from the checking unit in order to achieve similar signal amplitudes for like information symbols, especially when an electronic reader is used.

The ID or credit cards usually consist of plastic and are relatively sturdy so that they cannot be bent or cracked. It has become apparent, however, that through age and repeated use the cards can bend so that during transport past the reading device their distorted shape can result in faulty orientation in relation to the control device and also the distance from the device might be inaccurate. This makes it necessary that the transport device be so designed that even bent and deformed cards are taken past the reading device in straight formation.

The prior-known devices for this purpose are equipped (at least in the vicinity of the reading device) with costly roller mechanisms which consist of a number of rollers which exert their effects on both longitudinal edges of the card. Such roller conveyors are suited to keep the longitudinal edges of the cards straight, but cannot prevent a bending, for example in cross direction, of the remaining portion of the card, so that they can perform their task to guarantee a reliable evaluation only in those cases in which the checking device is close to the longitudinal edge which is being transported by the roller mechanism. Moreover, such roller mechanisms have a tendency toward operational trouble because cards can bend and wrap themselves around the various rollers so that it becomes necessary to open the entire transport unit in order to correct a malfunction.

It is also possible to use a conveyor belt for the transport of the ID cards and in this way the design of the moving elements can be kept simpler and less costly. The conveyor belt is, however, not suited for a firm grip on the cards, but only fit—by its nature—to transport cards that lie on top of the belt past a reading or checking device.

Interruptions of operation due to bent cards in rollers cannot occur as in systems with roller mechanisms. Since belt-systems are simpler and cheaper to produce, they should be preferred in reading ID cards, but should provide at least the same accuracy as the systems with roller mechanisms.

SUMMARY OF THE PRESENT INVENTION

It is, therefore, the task of this invention to come up with a transport system that works with a transporting belt and at the same time provides accurate alignment of the cards and at the same time includes means to straighten out the major area of any deformed cards.

This task is solved, in this invention, in the following manner: along both sides of the transport course is arranged a straight guide groove for the longitudinal edge of the card to be processed; an endless conveyor belt between the guide grooves has at least on its upper side a gripper working on the transverse sides of the cards; a re-routing roll at the entrance side of the transport system is behind a feeding slot; transverse to the direction of movement, in the area of the reading device at least, one of the guide grooves is provided with spring means; and the distance between the side plates opposite the width of the card is smaller than the distance between the transverse guide grooves.

This invention makes it possible to use a simple conveyor belt only to create a movement, not a wide belt, on which cards can lie. The straight alignment of the longitudinal edges of the cards is effected through the two guide grooves into which the ID card is inserted during the feeding process (through the slot). Since the two guide grooves are provided along the total length of the transport course, the straight alignment of the cards is guaranteed in the entire moving area. Since each guide groove is effective along the entire longitudinal edge of the card, and not just at several fixation points as is the case of a roller mechanism, even the slightest bend in longitudinal direction of the card can be reliably eliminated, this also having a beneficial effect upon preventing bending of the card in cross-sectional direction.

Since the card lies upon the endless conveyor belt which is most efficiently located in the middle of the transport plane and can be provided with a relatively high tension in relation to the rather short transport distance, a card that is bent on its underside can be straightened out by the composite effects of the conveyor belt and the lateral guide grooves. A straightening out of a card that is bent upwards in cross-sectional direction can be effected if the endless conveyor belt is equipped with a gripper. This gripper, in view of the location of the re-routing roller behind the insertion slot can, due to its re-routing movement, also produce elevated cross-sectional edges for the cards and can align these during the start of the linear movement so that the described bending is eliminated.

A further characteristic which contributes to the correct interpretation of the ID card is the development of one guide groove at least in the area of the reading unit with spring means. Since, at this point, the complementary distance of the guide grooves is smaller than the width of the card, it is achieved, upon movement of the card along the reading unit, due to the spring design of one of the guide grooves, that this spring action presses the card against the non-spring loaded opposite groove. Thus, it is ensured that the card moving past the reading unit passes in a certain, exactly prescribed orientation so that the information symbols on the card pass the reading device in a very correctly maintained line of movement.

Introduction of the card into the endless conveyor belt is effected by insertion into the feeding end of the transport direction through the feeding slot. Herewith, the card comes in contact with the guide grooves and the gripper provided on the endless conveyor belt. In order for the rear of the card to be securely gripped by the gripper, it is possible, for example, to have a mechanical pusher near the feeding slot by which the card is pushed in so far that an effective push of the gripper on the rear end of the card is exerted. To prevent the gripper from coming under the card, a microswitch can be provided for in the direction of the transport course which sets the endless conveyor belt in motion only when the card is inserted properly and which, perhaps by means of another micro-switch, guarantees a stop of the transport system so that the gripper stops shortly before the position at which it will grip the card.

A special operational effort for the proper insertion of the cards is avoided, however, per a further development of this invention: on the axle of the previously mentioned re-routing roller is arranged a friction wheel which, together with another, counter-pressure roller, effects the pulling-in of the card onto the endless conveyor belt. Thus, it becomes possible that the card, from case to case, will only be inserted so far that its frontal edge reaches between the friction wheel and the counter-pressure wheel. If, through possible action of a micro-switch as previously mentioned, the moving mechanism is set in operation, the friction wheel on the axle of the re-routing roller turns and transports the ID card, with the aid of the counter-pressure roller until its rear end is released. Consecutively, the gripper can become effective on the rear end of the card and can push the card ahead. It is practical to arrange the friction wheel immediately next to the re-routing roller so that the effect of the gripper and the friction wheel on the rear end of the card comes into action at closely related points and misalignment or tipping of the ID card is avoided if it is not yet fully released by the friction wheel when the gripper is already in effect.

Preferably, the upper strand of the endless conveyor is arranged in the transport plane as determined by the guide grooves. This will ensure that even the slightest downward bend of the cards can be corrected.

In a further development of the present invention, the guide groove having spring means is bordered by a lateral guide rail which, transverse to the transport direction, is shiftable in a guide-slot and is spring-tensioned along its length, the spring load affecting the longitudinal edge of the card. Thus, the guide groove is formed by a guide slot which, for example, can be arranged in a side plate of the transport unit. The guide slot is then combined to a guide groove with the guide rail, and the guide rail is spring-tensioned on its side away from the course of transportation. If the guide slot is arranged in a side-plate, a spring can act upon a pressure plate which rests on at least two points on the guide rail extending from the side plate, and rests, likewise, on the side plate below the point on which the spring is effective.

Thus, a very simple mechanism is created which, without large spatial requirements, makes possible a uniform spring force along the entire length of the guide rail. This is important in view of the requirement that the pushing force provided on the card be uniform in the entire area of the guide rail in order to avoid cant of the cards in the guide grooves.

The endless conveyor belt is preferably equipped with two grippers at a distance at least of a card-length from each other. In this way, the ID card can be moved forward by one gripper and backward by the other. If the spacing of the two grippers corresponds with the length of the card, an especially quick re-routing of the card movement at the end of the transport course can be effected. Re-routing can, for example, be done to pass the card repeatedly along the reading unit or to return it through the feeding slot.

Preferably, the reading unit is situated beneath the transport plane and above the transport plane a spring-loaded pressure roller is provided. This aids the correct spacing of the card plane in relation to the reading unit. Moreover, an upward bend of the card which still may exist can be straightened by the spring-loaded pressure roller.

Preferably, the transport plane is covered by an upper guide plate. This guide plate can serve the following purposes in addition to the straightening out of bent ID cards: holding the described pressure roller and the pressure wheel at the feeding slot as well as holding eventual control elements such as a micro-switch, etc.

DESCRIPTION OF THE DRAWINGS

An example of the transport unit of the present invention is herein described with the aid of the drawings in which.

DESCRIPTION OF A PREFERRED EMBODIMENT

Figure 1:
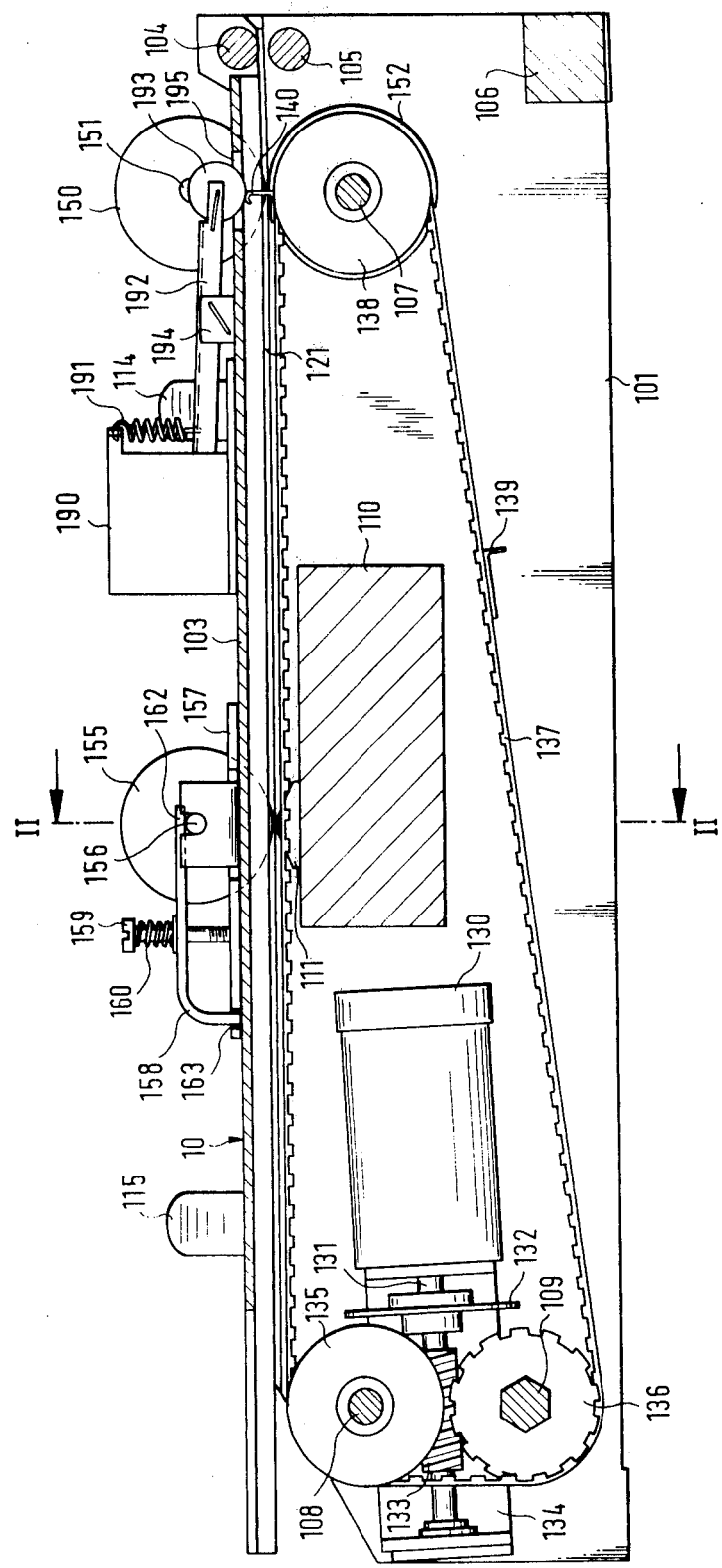
FIG. 1 is a longitudinal cross-section of a transport unit of the present invention.
Figure 2:
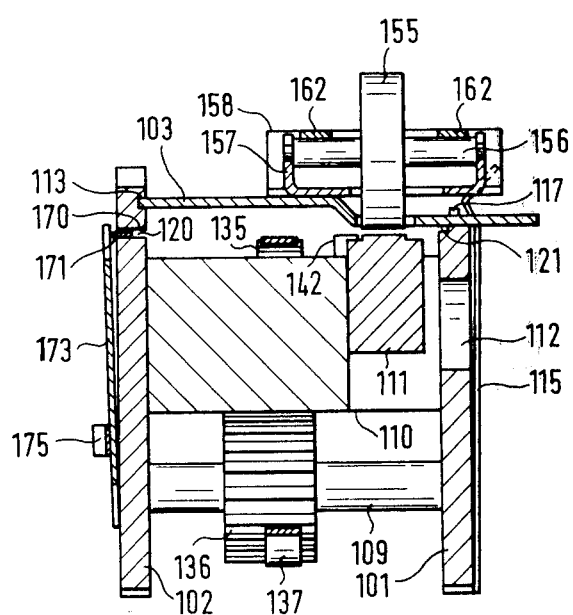
FIG. 2 is a transverse cross-section taken substantially at line II—II of FIG. 1.

In FIG. 1, a longitudinal section of the transport unit 10 is illustrated which is constructed per the present invention. This transport unit consists, in its housing, mainly of 3 plates, i.e. two side plates 101 and 102 of which the plate 102 is illustrated in FIG. 2, and an upper coverplate 103, the latter, as still to be described, also serving as a guide for an ID card and, therefore, will be called guide plate 103. The two side plates 101 and 102 are connected with each other through crossbars 104, 105, and 106 as well as through roller axles 107, 108, and 109. The upper guide plate 103, as can best be seen in FIG. 2 is arranged in a longitudinal groove 113 of the side plate 102 on one hand, and on the upper edge of the side plate 101 on the other hand.

Figure 3:
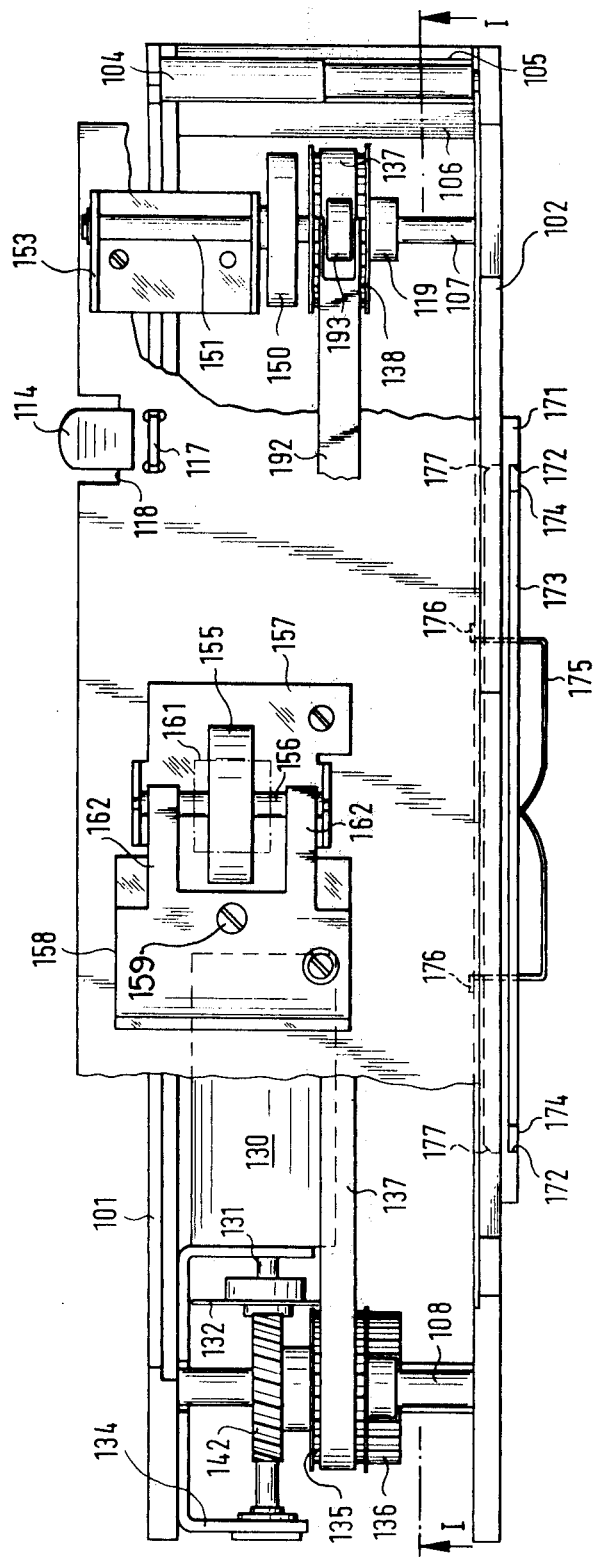
FIG. 3 is a fragmentary top view of the transport device of the present invention.

The locking of the upper guide plate 103 is effected through flat springs 114 and 115 which are attached to the outside of side plate 101 near the lower edge and which are provided on their upper end with a catch-rim. The springs 114 and 115, with their upper catch-rims, prevent an upward swiveling of the upper guide plate 103 so that it sits firmly on side plate 101. A shifting of the upper plate 103 is prevented, in addition, through small protuberances 117 on the side plate 101 which grip into correspondingly dimensioned notches in the guide plate 103. In FIG. 3, such protuberance 117 as well as the flat spring 114 can be seen. As also can best be seen in FIG. 3, the upper guide plate 103 has a recess 118 for the flat spring 114.

In the housing formed by the side plates 101 and 102 and the upper guide plate 103, the transport mechanism is arranged which consists of three tooth-equipped transport rolls 135, 136, and 138, situated on the previously described axles 108, 109 and 107 respectively. Over these transportation rollers, an endless conveyor belt 137 is guided which is also equipped with teeth. Two grippers or pushing elements 139 and 140 are mounted on the conveyor belt 137. The two grippers 139–140 have a distance from each other that is just slightly larger than the length of an ID card.

For the drive of the endless conveyor belt 137, an electric motor 130 is provided whose shaft 131 is located in a mounting 134 which is attached to the side plate 101. The motor 130 is flanged to this mounting and drives on its shaft a worm gear 133 which meshes with a gear wheel 142 which is not visible in FIG. 1. This worm wheel 142, shown in FIG. 3, sits on the axle 108 for the drive roller 135 of the endless conveyor belt 137. The two other rollers 136 and 138 are, therefore, idle running rollers and provide, at the designated point, a re-routing of the endless conveyor belt 137.

Between side plates 101 and 102 is further arranged an evaluation block 110 which can consist, for example, of aluminum casting and which supports a reading unit 111. This can be, for example, a sensor head which works according to the electro-magnetic principle, which can be adjusted on the evaluation block 110 through a recess 112 (FIG. 2). The necessary adjustment elements are not shown in FIG. 2, but they can take the form of the usual adjustment screws.

Referring to FIG. 1, behind the tooth-equipped re-routing roller 138, a friction wheel 152 is arranged on the axle 107; the diameter of the friction wheel is slightly larger than the combined diameter of the re-routing roller 138 and of the endless conveyor belt 137. Opposite from the friction wheel 152 is a pressure wheel 150, held by the upper guide plate 103 and mounted on an axle 151. Together with the friction wheel 152, it forms a transport slot for an ID card that is to be inserted, as illustrated in FIG. 1, in the transport unit from the right-hand side. The pressure wheel 150 extends for this purpose through a recess (not shown in FIG. 1) downward to immediately face the friction wheel 152.

The reading unit 111 is coordinated with a pressure roller 155 on the upper guide plate 103 which presses an ID card against the reading unit 111 and extends, at the same time, through a recess (not shown) in the upper guide plate 103 downward. The pressure roller 155 rests on an axle 156 which is vertically shiftable in a mounting 157. The axle 156 is under spring-pressure, exerted by a spring 160 which has one end attached to the mounting 157 by means of a screw 159, and the other end engaging a swivel platform 158 which presses with the two arms 162 (FIG. 3) against the axle 156 of pressure roller 155. The rear end of the swivel platform 158 is coupled with the mounting 157 in a bearing 163. In the bearing 163, the swivel platform 158, therefore, can be adjusted upward against the spring force of the spring 161 if an ID card comes between the pressure roller 155 and the reading unit 111.

In FIG. 1, a guide groove 121 can be seen as being formed between the part of upper guide plate 103 that is crimped off downwardly and the upper edge of the side plate 101. This guide groove 121 runs at the level of the upper strand of the endless conveyor belt 137 and/or of the transport slot formed by the friction wheel 152 and the pressure wheel 150 and the upper surface of the reading unit 111.

An ID card per FIG. 1 is inserted into the transport unit from the right-hand side between the two round bolts 104 and 105 which connect the two side plates 101 and 102 with each other. These round bolts 104 and 105 are arranged so that an ID card situated between them enters guide groove 121 automatically. FIG. 1 shows further a micro-switch 190 on the upper guide plate 103 having an actuating element 192 formed as a lever, the free end of which carries a roller 193. The lever 192 is located in a bearing 194 on the guide plate 103 with its end facing switch 190 suspended by a spring 191. The roller 193 on the lever 192 extends through a recess 195 of the upper guide plate 103 into the interior of the transport mechanism and is pressed upward as soon as the gripper 140 comes into its area. In this manner, the micro-switch 190 is activated and turns off the drive motor 130 so that the endless conveyor belt 137 assumes the resting position shown in FIG. 1.

If an ID card, per illustration in FIG. 1, is pushed into the transport unit from the right-hand side, it could activate a further micro-switch (not shown) which switches on the drive motor 130. The ID card would thus be transported by the friction wheel 152 and its pressure wheel 150 to be deposited on the upper portion of the endless conveyor belt 137 until its rear end is released by the two wheels 150 and 152. Hereby, the endless conveyor belt 137 has moved on so far that its gripper 139 has reached the rear end of the ID card and can push this to the reading unit 111 or beyond.

Through other, not illustrated, micro-switches, the drive motor 130 could be changed in direction so that the ID card could be reversely transported and could, if desired, be ejected between the two round bolts 104 and 105. It is also possible to change the direction of the drive of the electric motor repeatedly in order to pass the card several times past the reading unit 111. These measures are not necessary to the present invention and, therefore, need not be explained in detail within this context. It should be mentioned, however, that in view of a "slotted disk" 132 located on the motor shaft 131 the running speed of the endless conveyor belt 137 can be controlled via an optical (not shown) reading unit, likewise, the lengths of movement, from situation to situation, of the endless conveyor belt 137 can be controlled.

In the cross-section II—II illustrated in FIG. 2, the coordination of the two guide grooves 120 and 121 can be seen; these determine the transport plane in which an ID card can be moved by means of the endless conveyor belt 137. Moreover, it can be seen that the upper guide plate 103, on the side of the endless conveyor belt 137 on which the reading unit 111 rests, is only a short distance from the reading unit 111 and thus forms with same, so to speak, a guide slot which is further narrowed down by the pressure roller 155. Also, the upper guide plate 103 runs along the complete length of the transport unit and thus exerts with its right side, which is extended downward, a guiding effect on an inserted ID card. The left portion of the upper guide plate 103, as illustrated in FIG. 2, is shifted upward so that enough room is provided for the movement of the grippers 139 and 140 on the endless conveyor belt 137.

Also recognizable in the cross-section in FIG. 2, is the mounting for the axle 156 of the pressure roller 155. Moreover, the arms 162 of the swivel platform 158 are shown as lying on axle 156 in the cross-sectional illustration.

The left side plate 102, for part of its length, but at least in the area of the reading unit 111, is slotted in the vicinity of the guide groove 120; this slot is marked 170 in FIG. 2. In the slot 170 is a guide rail 171 which is pressed, spring elastically, into the slot 170 by the plate 173 and the leaf spring 175 on the lower half of the plate. The guide rail 171 is so wide that, when the ID card is not inserted, the distance between the two guide grooves 120 and 121 is somewhat smaller than the width of an ID card. If a card is fed into and transported through the system, it reaches the area of the slot 170 and pushes the guide rail 171 (as shown in FIG. 2) to the left so that the force of the flat spring 175 pushes it to the right into the guide groove 121. In this manner, it is guaranteed that a moving ID card passes by the reading unit 111 each time in the same accurate orientation so that every line of information symbols will be read correctly.

FIG. 3 shows the transport unit in a view from above. The upper guide plate 103 is outlined with a dashed-in line in order to show, on the one hand, the location of the driving mechanism and on the other hand the arrangement and bearing of the pressure wheel 150 in relation to the re-routing roller 138. In the left portion of FIG. 3, it can be seen that the worm 133, shown in FIG. 1, on the shaft 131 of the drive motor 130 drives a worm gear 142 which is mounted on axle 108 of the drive roller 135. The worm gear 142 can also be seen in FIG. 2.

In the right-hand portion of FIG. 3, the pressure wheel 150 is shown with its axle 151 which is held in a mounting 153 on the upper guide plate 103. The pressure wheel 150 is arranged directly above the friction wheel 152 (not shown). Because both wheels are arranged directly beside the re-routing roller 138, the force acting upon the rear end of a card fed into the transport system becomes effective on two closely neighboring points, on the one hand through the two wheels 150 and 152 and on the other hand through the grippers arranged on the endless conveyor belt 137, for example, through the gripper 139 (FIG. 1).

Further, FIG. 3 shows the lever 192 for the micro-switch (not shown) which, with its roller 193, arranged directly above the endless conveyor belt 137 produces upon the passing of a gripper, for example gripper 140, a switching off and stopping of the transport unit.

In FIG. 3 is also shown the cooperation of the flat spring 175 in relation to the pressure plate 173 and the guide rail 171. The guide rail 171 has a recess 172 on its outer side into which pressure plate 173 grips with protrusions 174. Since the leaf spring 175 is formed as a double-leaf spring, it works with its center on pressure plate 173 and exerts a pressure upon same because it is anchored with its end 176 through the side plate 102 on its inner side.

The inner portion of guide rail 171 is represented by a dashed-line; it is provided with cantered edges 177 so that a card arriving in the transport system and moving in guide groove 120 reaches cantered edge 177 and can easily push guide rail 171 to the side.

In view from above, as per FIG. 3, the bearing for pressure roller 155 is to be seen, whose axle 156 is arranged in mounting 157 and which is pressed downward by the two arms 162 of swivel platform 158 by means of the force of spring 160 on the screw 159. The pressure roller 155 extends downward through a recess 161 (shown as dash-dot line) of the upper guide plate 103 so that it becomes directly effective upon an ID card passing under the guide plate 103 and presses same against the reading unit 111.

Figure 4:
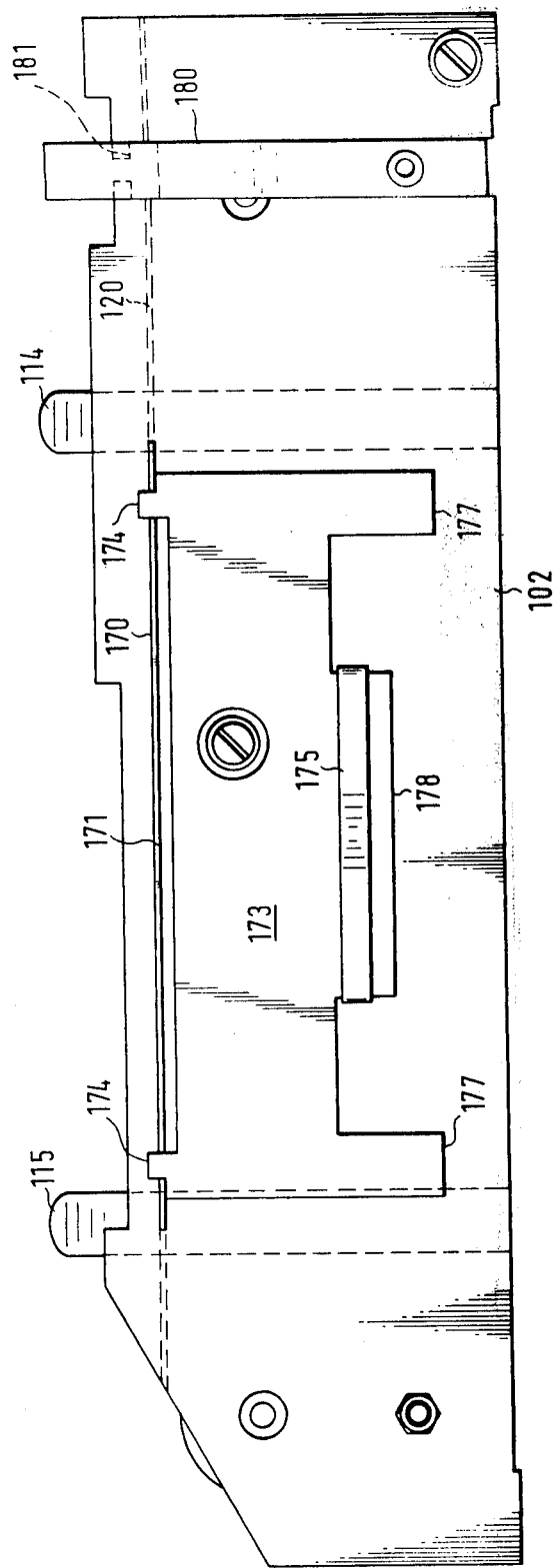
FIG. 4 is a side view of the transport unit of the present invention.

In FIG. 4, a side view of the transport unit is shown. Schematically is shown the course of the guide groove 120 provided in the side plate 102 which, in the area of the guide rail 171, is formed as the slot 170. Also shown are the upper ends of the flat springs 114 and 115 on the outer side of the side plate 101 (FIG. 2) whose further course downward is outlined in a dashed-line. Pressure plate 173 acts, with its upper protrusions 174, on the guide rail 171 and has one lower protrusion 178 on which the leaf spring 175 is effective. On the outer edges of the pressure plate 173, downward extending protrusions 177 are provided whose under edges lie against the side plate 102. Through this design of the pressure plate 173, in combination with the leaf spring 175, a uniform transmission of force onto the guide rail 171 is achieved so that a so-called "parallel-spring" results. This is made possible by the fact that the effect of the spring force lies under the diagonal lines which connect the protrusions 174 and 177.

Shown also in FIG. 4, on the right end of side plate 102, is a leaf spring 180 which is attached to the exterior side of the side plate 102 and whose upper end can be moved freely. This leaf spring can serve as an activating element for a micro-switch (not shown), the element being provided with a protrusion which reaches into the transport course of an ID card coming from the right-hand side through a recess 181 in the side plate 102. If a card is pushed into the transport unit, a micro-switch can be activated at the point of the recess 181 via the leaf spring 180 so that the drive motor 130 is switched on and the card is pulled into the transport unit in the described manner with friction wheel 152 and the pressure wheel 150.

The preceding description makes it apparent that a card inserted into the transport device is always aligned perfectly straight, even if large deformations in the card exist. Essential in this process are the guide grooves 120 and 121, but also the upper guide plate 103 is of great advantage because it limits the transport level on that side of the endless conveyor belt 137 on which the reading device 111 is arranged. The gripper 139, illustrated in the drawings as being formed on the endless conveyor belt 137, can also be formed in hook-shape so that it can work from above on the rear end of a card when the belt drives over the re-routing roller 138 and thereby straighten out any buckling of the card in a cross-sectional direction. This is further aided by the changeable orientation of gripper 139 as soon as it comes out of the curved moving area on re-routing roller 138 and enters the straight line of motion of upper strand of endless conveyor belt 137.

The transport device of the present invention is very versatile and widely applicable, and it can solve the most varying transportation problems, depending on the control of the drive motor. If it is detected, for example, that an introduced card is being used fraudulently, the card can be transported beyond the drive roller 135 and can reach an internal disposal container. In this way, return and ejection of the card through backward transportation is avoided. This and other measures which need not be discussed here, can be taken by this transport device since its design provides, on the one hand, for one-directional transport with ensuing ejection from the front end, but on the other hand also allows a reversal of directions.

We claim:

1. A transport device for the reading of identification cards such as ID cards, credit cards and the like during linear movement of the cards along a transport course in a transport plane, said device having a housing, said cards being introduced through a feeding slot in said housing and means for transporting the cards past a reading unit, characterized by the housing having a longitudinal guide slot arranged along both sides of the transport course for receiving the longitudinal sides of the cards to be processed, said transport means comprising an endless conveyor belt having a pushing element which abuts against the transverse sides of the cards, a belt routing roller being arranged immediately after the feeding slot and means for aligning said cards relative to said guide slots, said aligning means comprising an elongated guide rail longitudinally positioned in one guide slot and spring means for laterally urging said guide rail toward the other guide slot, and wherein at least one guide slot is formed in a side plate of the housing, and wherein said aligning means further comprises a pressure plate positioned along an external side of the side plate, said pressure plate engaging said guide rail at at least two longitudinally spaced points against said guide rail and extending downwardly therefrom, and wherein said spring means further comprises a spring member which resiliently engages said pressure plate at a point below the transport plane of the device.

2. The transport device as defined in claim 1, further characterized by a friction wheel mounted on an axle for said routing roller, a pressure wheel rotatably mounted on an axle at a position spaced from said friction wheel and forming a portion of the feeding slot therebetween, said friction and pressure wheel functionally engaging and pulling a card inserted into said feed slot onto said endless conveyor belt.

3. The transport device as defined in claim 2, wherein the transport plane is covered by an upper guide plate.

4. The transport device as defined in claim 3, wherein the upper guide plate serves also as a mounting support for the pressure wheel.

5. The transport device as defined in claim 2, characterized in that the friction wheel is positioned immediately axially adjacent the routing roller.

6. The transport device as defined in claim 1, characterized by the fact that the upper portion of the endless conveyor belt lies in the transport plane as determined by the guide slots.

7. The transport device as defined in claim 1, wherein the spring member engages said point on the pressure plate, said point being located below the diagonals formed across said pressure plate from the engagement of the pressure plate with the guide rail and to the diagonally opposed support point of the pressure plate against the side plate.

8. The transport device as defined in claim 7, wherein said spring member is a double-leaf flat spring having free ends anchored to said side plate and a center which engages the pressure plate.

9. The transport device as defined in claim 1, characterized in that the endless conveyor belt is provided with at least two pushing elements spaced at least one card length apart.

10. The transport device as defined in claim 9, characterized in that the pushing elements have approximately the same width as the endless conveyor belt.

11. The transport device as defined in claim 1, wherein the reading unit is positioned under the transport plane and a spring-tensioned pressure roller is positioned opposite the reading unit.

12. The transport device as defined in claim 11, wherein the pressure roller is mounted on a vertically movable axle, an axle support for said pressure roller attached to the upper guide plate and which maintains said pressure roller spaced away from the reading unit, and a spring plate which abuts against said pressure roller axle and urges said pressure roller toward said reading unit.

13. The transport device as defined in claim 12, wherein the spring plate is pivotally mounted onto the upper guide plate.

14. A transport device for the reading of identification cards such as ID cards, credit cards and the like during linear movement of the cards along a transport course, in a transport plane, said device having a housing, said cards being introduced through a feeding slot in said housing and means for transporting the cards past a reading unit, characterized by the housing having longitudinal guide slots arranged along both sides of the transport course for receiving the longitudinal sides of the cards to be processed, said transport means comprising an endless conveyor belt having at least one pushing element which abuts against the transverse sides of the cards, a belt routing roller being arranged immediately after the feeding slot and wherein the reading unit is positioned under the transport plane and a spring-tensioned pressure roller is positioned opposite the reading unit, said pressure roller being mounted on a vertically movable axle, an axle support for said pressure roller axle, said axle support being attached to the upper guide plate and maintaining said pressure roller spaced away from the reading unit, and a spring plate which abuts against said pressure roller axle and urges said pressure roller toward said reading unit and wherein at least one guide slot is formed in a side plate of the housing, and wherein said transport device further comprises means for aligning said cards relative to said guide slots, said aligning means further comprises a pressure plate positioned along an external side of the said plate, said pressure plate engaging a guide rail at at least two longitudinally spaced points against said guide rail and extending downwardly therefrom, and a spring which resiliently engages said pressure plate at a point below the transport plane of the device.

15. The transport device as defined in claim 14, further characterized by a friction wheel mounted on an axle for said routing roller, a pressure wheel rotatably mounted on an axle at a position spaced from said friction wheel and forming a portion of the feeding slot therebetween, said friction and pressure wheel frictionally engaging and pulling a card inserted into said feed slot onto said conveyor belt.

16. The transport device as defined in claim 15, characterized in that the friction wheel is positioned immediately axially adjacent the routing roller.

17. The transport device as defined in claim 14, characterized by the fact that the upper portion of the endless conveyor belt lies in the transport plane as determined by the guide slots.

18. The transport device as defined in claim 14, wherein the spring engages said point on the pressure plate, said point being located below the diagonals formed across said pressure plate from the engagement of the pressure plate with the guide rail and to the diagonally opposed support point of the pressure plate against the side plate.

19. The transport device as defined in claim 14, wherein said spring is a double-leaf flat spring having free ends anchored to said side plate and a center which engages the pressure plate.

20. The transport device as defined in claim 14, characterized in that the endless conveyor belt is provided with at least two pushing elements spaced at least one card length apart.

21. The transport device as defined in claim 20, characterized in that the pushing elements have approximately the same width as the endless conveyor belt.

22. The transport device as defined in claim 14, wherein the transport plane is covered by an upper guide plate.

23. The transport device as defined in claim 22, wherein the upper guide plate serves also as a mounting support for the pressure roller.

* * * * *